T. A. EDISON.
STORAGE BATTERY.
APPLICATION FILED JUNE 16, 1920.

1,377,194.

Patented May 10, 1921.

Witnesses:
N. D. Fisher
William A. Hardy

Inventor:
Thomas A. Edison
By Dyer and Holden
his Attys.

UNITED STATES PATENT OFFICE.

THOMAS A. EDISON, OF WEST ORANGE, NEW JERSEY.

STORAGE BATTERY.

1,377,194.  Specification of Letters Patent.  Patented May 10, 1921.

Application filed June 16, 1920. Serial No. 389,290.

*To all whom it may concern:*

Be it known that I, THOMAS A. EDISON, a citizen of the United States, and a resident of Llewellyn Park, West Orange, Essex county, New Jersey, have made certain new and useful Improvements in Storage Batteries, of which the following is a description.

My invention relates generally to storage batteries, and more particularly to storage batteries of the Edison type wherein nickel hydroxid is opposed to finely divided electrolytically active iron or oxid of iron in an alkaline solution as the electrolyte. This application is to be regarded as a continuation of my copending application, Serial No. 324,058, filed September 16, 1919, entitled Storage batteries, as to all subject matter common to both applications. In this application the invention is broadly claimed. The claims of application, Serial No. 324,058, are directed to the specific form of the invention therein disclosed.

The principal object of the present invention is to provide an improved storage battery with the elements thereof so constructed and arranged as to result in a greatly increased discharge rate, especially in the case of storage batteries of the Edison type.

To effect the starting of the internal combustion engine employed for driving an automobile by means of a starting system comprising an electric starting motor and a storage battery for supplying current to the motor, it is necessary for the storage battery of such a starting system to have a high rate of discharge. In the case of the Ford car, a storage battery capable of supplying the starting motor with current of 150 to 175 amperes at 6 volts is required. Edison storage batteries being now made with longevity as one of the principal objects in view, the size, cost and weight of Edison batteries of the present construction which will give sufficiently high discharge rates, are too great to permit their general use in starting systems for automobiles, especially in the case of the Ford car.

This invention is directed especially to an improved storage battery of the Edison type adapted to meet the requirements for commercial use in automobile engine starting systems, namely, small weight, low cost and high discharge rate.

More specifically described, my invention consists in the employment of a new and improved battery pile designed especially for use in alkaline batteries of the Edison type, in place of the present plate assembly of such batteries consisting of alternately arranged positive and negative plates separated and insulated from each other, each of which plates comprises a steel grid carrying a plurality of perforated pockets or tubes with active material tightly packed therein. My invention also consists in the method of producing such improved battery pile. This battery pile preferably consists of a series of very thin imperforate conductive sheets, preferably formed of pure nickel, separated by thin, porous flexible sheets of suitable insulating material, preferably long fiber asbestos paper, with thin layers of finely divided active material respectively disposed between the surfaces of each of the thin nickel sheets and the adjacent insulating sheets and preferably carried by the latter, the whole being held together under pressure with the layers of active material in firm, close, surface contact with the respective nickel sheets. In the case of batteries of the Edison type the layers of active material for the negative elements preferably consist of electrolytically active finely divided iron, preferably mixed with a small amount of mercury and the layers of active material for the positive elements preferably consist of finely divided or powdered nickel hydroxid. Other suitable active materials may, however, be employed instead of the finely divided iron and nickel hydroxid. For example, in place of finely divided iron as the active material for the negative elements, finely divided cadmium or cobalt may be employed as respectively disclosed in my Patents No. 692,507 dated February 4, 1902, and No. 721,682 dated March 3, 1903; and in place of the nickel hydroxid as the active material for the positive elements, an oxid of cobalt may be employed as disclosed in Patent No. 704,304 dated July 8, 1902. The very solid particles of active material, especially in the case of nickel hydroxid, are irregular in shape and the entire surface of each layer ordinarily presents a great number of minute, slightly-spaced projections, tending to produce imperfect surface contact between the conductive sheets and the adjacent layers of active material, which conditions, if not overcome, would render the internal resistance of the pile greater, and the capacity and discharge rate thereof less. In order to overcome this objection, where the pile is thin and composed of few elements, I first assemble such elements and then before securing the latter together, subject the assembly to enormous pressure as by means of a hydraulic press. The pressure employed in this step is sufficient permanently to deform the insulating sheets and the layers of active material and the particles thereof, and to flatten out against the adjacent thin conductive sheets all the slight projections on the surfaces of said layers, so that such layers will be in intimate, continuous and uninterrupted surface contact with said sheets. I find that in the neighborhood of 10,000 pounds to the square inch is the most suitable pressure to employ for this purpose. While still subjected to this pressure, the elements of the pile are secured together as by turning up lightly the nuts on bolts extending therethrough, and the pressure is then released from the press and the pile removed from the latter. The pile will then expand somewhat and the bolts will act to hold the elements of the pile together under a permanent pressure much less than the deforming pressure but sufficient to maintain the surfaces of deformed layers of active material in firm, close and uninterrupted contact with the adjacent surfaces of the conductive sheets. In the specific construction disclosed in my copending application referred to above, the conductive sheets are formed of nickel-plated sheet steel about .015" in thickness. In the present invention, however, while these comparatively thick conductive sheets may be used, I preferably employ in place thereof exceedingly thin conductive, metallic sheets or foils preferably of substantially pure malleable nickel, and preferably about .001" to .002" in thickness, as I find that much better results are obtained therewith. Moreover, the weight of these exceedingly thin sheets or foils is so small as to render it practicable to employ the expensive metal nickel therefor. Furthermore, the use of these light thin conductive, metallic sheets or foils results in a decided reduction in the weight of the cell and also in the thickness of the pile, and, therefore, in the size of the cell. Substantially pure nickel foils or sheets of the thickness specified may be readily and economically produced by electro-deposition in the manner disclosed in my copending application Serial No. 324,291, filed September 18, 1919 and entitled Production of nickel.

In case the battery pile is of considerable thickness, I find that the method described above is impracticable as the pressure necessary to be applied to the pile to deform permanently the layers of active material and the insulating sheets sufficiently to obtain the desired surface contact between the active material and the conductive nickel sheets or foils, is so great that the material between the adjacent nickel sheets or foils will be forced out and deformed more than necessary. Accordingly, where a battery pile of considerable thickness is to be produced, a number of thin sections each comprising only a few of the very thin conductive nickel sheets or foils with the sheets of asbestos paper and active material disposed therebetween are first made up and separately subjected to the deformative pressure as described above. After the deformative pressure has been removed from these sections, the same are assembled by placing them on top of each other and the assembly is then subjected in a press to sufficient pressure, but much less than the deformative pressure to which the sections were separately subjected, to force the adjacent surfaces of the sections into intimate contact. While the assembly is still under pressure, the elements thereof are secured together as by lightly turning up the nuts on bolts extending therethrough and the pressure is then released from the press and the pile removed from the latter. The pile then expanding somewhat, the bolts will act to hold the elements of the pile together under a permanent pressure much less than the deformative pressure, but sufficient to maintain the surfaces of the deformed layers of active material respectively in close, uninterrupted contact with the adjacent surfaces of the thin nickel sheets or foils, and to render the pile capable of withstanding the gas pressure produced therein by electrolytic action when the cell in which the pile is assembled is being charged and discharged.

An alternative method of forming a thick battery pile in accordance with my invention is as follows: A plurality of the thin asbestos insulating sheets are coated with layers of nickel hydroxid on one side and with layers of finely divided electrolytically active iron or other suitable active material on the other side, and these coated sheets while in a slightly damp condition, are respectively placed between a large number of superposed heavy steel plates or dies, one of such coated sheets between each pair of adjacent dies, and the whole then subjected to a deformative pressure of about 10,000 pounds to the square inch in a hydraulic press. The pressure is then released, the coated asbestos sheets removed from between the dies and assembled into a battery pile by superposing the same and a plurality of the thin nickel conductive sheets or foils with the latter respectively disposed between the adjacent coated insulating sheets. The arrangement of the coated insulating sheets and the thin nickel sheets or foils in this pile, is such that each thin nickel sheet or foil is in engagement on both sides with layers of the same active material but different from the active material in engagement with any adjacent nickel sheet or foil, whereby the pile consists of alternating positive and negative elements. The pile is then subjected to a pressure much less than the deformative pressure, but sufficient to bring all the adjacent surfaces of the layers of active material and thin nickel sheets or foils into good and uninterrupted electrical and surface contact. While the pile is still under this pressure, the elements thereof are secured together as by lightly turning up the nuts on bolts extending therethrough and said pressure is then released to a much less pressure.

In order that my invention may be more clearly understood, attention is directed to the drawing accompanying and forming a part of this specification, and in which.

Figure 1:
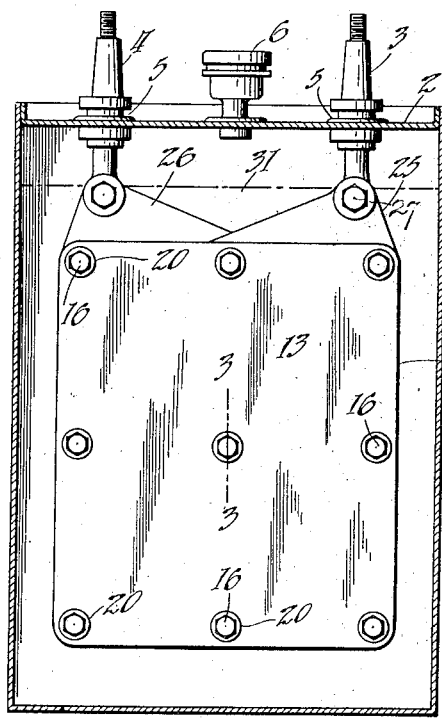
Figure 1 is a view in side elevation of a storage battery cell in accordance with my invention, the container being shown in section.
Figure 2:
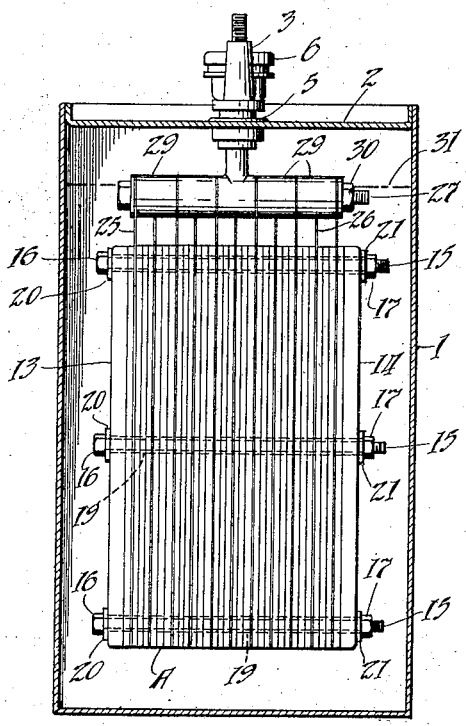
Fig. 2 is an end view in elevation of the cell shown in Fig. 1, the container being shown in section; and, Fig. 3 is a greatly enlarged fragmental sectional view taken on line 3—3 of Fig. 1.
Figure 3:
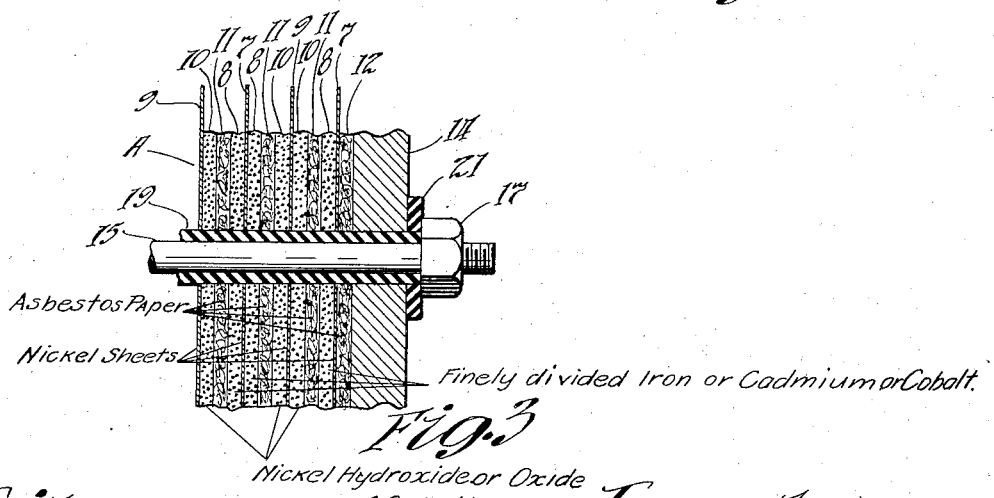

Referring to the drawing, reference character 1 represents the battery container and 2 the top thereof. This container is similar to that employed in the usual type of Edison batteries and is preferably made of nickel-plated steel. Negative and positive poles 3 and 4 extend through suitable stuffing boxes 5, 5 provided in the top 2 of the container, and form fluid-tight joints therewith. The top 2 is also provided with the usual filler 6 through which the electrolyte of the cell may be replenished.

Reference character A represents my improved battery pile which is made up of a plurality of superposed and alternately arranged negative and positive elements. Each of the negative elements comprises an imperforate very thin nickel sheet or foil 7 and two thin layers 8, preferably of electrolytically active finely divided iron mixed with a small amount of mercury, respectively disposed on opposite sides of this thin sheet or foil and in contact therewith. Each of the positive elements comprises a thin nickel sheet or foil 9 similar to sheets or foils 7 of the negative elements, and two thin layers 10 of powdered nickel hydroxid, respectively disposed on opposite sides of the said sheet or foil 9 and in contact therewith. Thin sheets 11 of long fiber asbestos paper are respectively disposed between the negative and positive elements, and each of these sheets preferably carries and is entirely covered or coated on one side with the layer 8 of finely divided iron which is in contact with the adjacent thin nickel sheet or foil 7, and on its other side with the layer 10 of nickel hydroxid which is in contact with the adjacent thin nickel sheet or foil 9. Two strong, very heavy nickel-plated steel presssure plates 13 and 14 are respectively disposed at the sides of the series of superposed negative and positive elements in contact therewith. The conductive sheets or foils 7 of the outermost negative elements are not in contact at their outer surfaces with layers of the finely divided iron, but are merely separated and insulated from the adjacent pressure plates 13 and 14 by uncoated asbestos sheets 12. Where the pile A is quite thin, the positive and negative elements and the heavy outer pressure plates 13 and 14 are first assembled in the positions just described and a plurality of rods 15 are respectively inserted through suitable openings provided therefor in the edge portions and centers of said plates and elements so that the heads 16 at one end of the rods will be closely adjacent one of the heavy pressure plates 13. The rods are of such length that they extend a slight distance outwardly beyond the pressure plate 14. Each of the rods 15 extends through a sleeve 19 of hard rubber or other suitable non-conducting material which is disposed in and closely fits the openings provided for such rods in the plates 13 and 14 and in the positive and negative elements. The head 16 of each rod 15 is suitably insulated from the pressure plate 13 as by means of a washer 20 formed of hard rubber or other suitable non-conducting material. The battery pile being thus assembled is then subjected to an enormous deformative pressure in a hydraulic or other press as described above. While still subjected to this pressure, nuts 17 are threaded on the ends of the rods 15 and are turned up so as to bring the same into light contact with non-conducting washers 21 mounted on the extending end portion of rods 15, and to bring said washers into light contact with the pressure plate 14. The pressure applied by the hydraulic press is then released and the pile removed from the press. The bolts 15 and nuts 17 now serve to securely fasten the plates 13 and 14 and the negative and positive elements together under a permanent and sufficient pressure to maintain the permanently deformed layers of active material firmly in intimate, uninterrupted surface contact with the respective thin nickel sheets or foils 7 and 9.

When the battery pile is to be made of quite a number of positive and negative elements so that it will be of considerable thickness, thin sections of the pile are first formed and separately subjected to the high deformative pressure as hereinbefore explained. These sections are then assembled by superposing the same, the bolts 15 inserted in the openings provided therefor in the elements and the assembly subjected to a much less pressure but sufficient to force the adjacent surfaces of the sections into intimate contact. While the assembly is still under pressure, the nuts on the bolts are turned up lightly, the pressure is then released whereupon the pile will expand somewhat and the bolts will act to hold the elements together under a permanent pressure sufficient to maintain the surfaces of the deformed layers of active material in close uninterrupted contact with the adjacent surfaces of the thin conductive sheets or foils. Instead of making a thick battery pile in this manner, I may employ the alternative method hereinbefore described.

The thin nickel sheets or foils 7 of the negative elements are provided at the top at one side with upwardly extending apertured lugs 26, while the thin nickel sheets or foils 9 of the positive elements are provided at the top and the opposite side with similar lugs 25. Steel bolts 27 and 28 respectively extend through the lugs 25 and 26 and have mounted thereon between each pair of adjacent lugs, steel spacing washers 29. The tightening of nuts 30 threaded on the bolts 27 and 28 serves to secure the spacing washers 29 and the corresponding lugs 25 and 26 firmly together in good contact with each other. One of the spacing washers 29 on the bolt 27 may be formed integrally with the negative pole 3 of the cell and one of the spacing washers 29 on the bolt 28 may be formed integrally with the positive pole 4. It will thus be seen that the negative and positive elements of the battery pile are respectively electrically connected with the poles 3 and 4 of the cell, and that the battery pile is rigidly connected to the poles and suspended therefrom.

Reference character 31 represents the level of the alkaline electrolyte in which the battery pile A is sustained, such electrolyte preferably consisting of a 21% solution of caustic potash or a 15% solution of caustic soda, containing about 2% by weight of lithium hydroxid.

Cells constructed as described herein have a very high discharge rate, and are of small weight, and accordingly the use thereof in starting systems for automobiles is practicable. The number and size of the positive and negative elements and the dimensions of the component parts thereof depends largely upon the use for which the cell is designed and of course may be varied as desired.

The layer of nickel hydroxid on each of the thin sheets of asbestos paper or other flexible insulating material carrying the same, however, should be only about .015" thick as the nickel hydroxid has a very small radius of conductivity. The layer or coating of finely divided iron on each of the insulating sheets carrying the same may be of such a thickness that it will readily receive capacity sufficient to discharge the adjacent layer of nickel hydroxid.

It is to be understood that my invention is not limited to the specific construction and methods shown and described herein, but that the same are subject to many changes and modifications without departure from the spirit of the invention and the scope of the appended claims.

Having now described my invention, what I claim as new and desire to protect by Letters Patent is as follows:

1. In a storage battery, a plurality of alternately disposed positive and negative elements, each of said elements comprising a conductive, metallic foil and finely divided active material maintained under pressure firmly in contact with said metallic foil, substantially as described.

2. In a storage battery, a nickel foil, an insulating sheet, active material disposed between said foil and sheet, and means for holding said foil and sheet together whereby the active material is constantly held under pressure firmly in contact with said nickel foil, substantially as described.

3. A storage battery pile comprising a plurality of superposed positive and negative elements, and insulating sheets of asbestos paper respectively disposed between adjacent positive and negative elements, substantially as described.

4. A battery pile comprising a series of superposed nickel foils separated by thin sheets of asbestos paper, layers of active material respectively disposed between the adjacent nickel foils and asbestos sheets, and means for securing all of said elements together whereby the layers of active material are held under pressure firmly in contact with the respective adjacent nickel foils, substantially as described.

5. In a storage battery, a conductive sheet, an insulating sheet, a layer of active material between said sheets, said layer of active material being permanently deformed by pressure so that the surface thereof adjacent said conductive sheet conforms to the adjacent surface of the latter, and means for holding said sheets together after deformation of the active material under a pressure less than the deformative pressure but sufficient to maintain said layer of active material in close, uninterrupted surface contact with said conductive sheet, substantially as described.

6. A battery pile comprising a series of superposed conductive sheets separated by sheets of insulating material, a layer of finely divided active material disposed between each pair of adjacent conductive and insulating sheets, said layers of active material being permanently deformed by pressure so that the surfaces thereof conform to the respective adjacent surfaces of said conductive sheets, and means for securing all of said elements together under a pressure less than the deformative pressure but sufficient to maintain the layers of active material respectively in close, uninterrupted surface contact with said conductive sheets, substantially as described.

7. A battery pile comprising a series of superposed nickel foils separated by sheets of asbestos paper, a layer of active material disposed between each nickel foil and each adjacent asbestos sheet, the layers of active material being permanently deformed by pressure so that the surfaces thereof conform to the respective adjacent surfaces of the nickel foils, and means for securing all of said elements together after deformation of the active material under a pressure less than the deformative pressure but sufficient to maintain said layers of active material in close, uninterrupted surface contact with the respective adjacent nickel foils, substantially as described.

8. In a storage battery, an alkaline electrolyte, and a pile comprising a plurality of superposed positive and negative elements disposed in said electrolyte, each of said elements comprising a conductive metallic foil and finely divided active material maintained under pressure, firmly in contact with said metallic foil, substantially as described.

9. In a storage battery, an alkaline electrolyte, and a pile comprising a plurality of superposed positive and negative elements disposed in said electrolyte, each of said elements comprising a conductive metallic foil and active material maintained under pressure firmly in contact with said foil, the active material for the positive elements comprising nickel hydroxid and the active material for the negative elements comprising finely divided iron, substantially as described.

10. A storage battery pile comprising a plurality of superposed positive and negative elements, each of said elements comprising a conductive metallic foil and active material maintained under pressure firmly in contact therewith, the active material for the negative elements comprising finely divided iron and the active material for the positive elements comprising nickel hydroxid, substantially as described.

11. In a storage battery, a conductive member, an insulating member, active material between said members, and means securing said members together whereby the active material is constantly maintained under pressure firmly in contact with said conductive member, substantially as described.

12. In a storage battery, a series of conductive members, insulating members respectively disposed between the adjacent conductive members, active material between each pair of adjacent conductive and insulating members, and means for securing said members together whereby the active material is constantly maintained under pressure firmly in contact with the adjacent conductive members, substantially as described.

13. In a storage battery, a series of superposed conductive members separated by members of insulating material, active material between the insulating members and the adjacent conductive members, the active material adjacent any pair of adjacent conductive members respectively comprising finely divided iron and nickel hydroxid, and means for securing said members together under pressure whereby the active material is constantly maintained firmly in contact with the adjacent conductive members, substantially as described.

14. In a storage battery, an alkaline electrolyte, a pile disposed in said electrolyte and comprising a series of superposed conductive members separated by members of insulating material, active material between the insulating members and conductive members, and means for securing said members together under pressure whereby the active material is constantly maintained firmly in contact with the conductive members, substantially as described.

15. In a storage battery, an alkaline electrolyte, and a battery pile disposed in said electrolyte and comprising a series of superposed conductive members separated by members of insulating material, active material between the insulating members and conductive members, the active material adjacent any pair of adjacent conductive members respectively comprising finely divided iron and nickel hydroxid, and means for securing said members together under pressure whereby the active material is constantly maintained firmly in contact with said conductive members, substantially as described.

16. The method which consists in subjecting an assembly comprising superposed members and a layer of active material between each two adjacent members, to a pressure sufficient permanently to deform the active material, removing the deformative pressure, and then securing said members together under a pressure less than the deformative pressure but sufficient to maintain each layer of active material firmly in contact with an adjacent member, substantially as described.

17. The method which consists in assembling a conductive member, an insulating member and a layer of active material comprising a mass of solid particles disposed between said members, and subjecting the assembly to a pressure sufficient permanently to deform the layer of active material and the particles thereof whereby the particles of active material adjacent said conductive member are deformed thereagainst and the surface of said layer adjacent such conductive member is conformed to the adjacent surface of the latter, substantially as described.

18. The method of forming a battery pile which consists in assembling a conductive member, an insulating member and a layer of active material comprising a mass of solid particles disposed between said members, subjecting the assembly to a pressure sufficient permanently to deform the layer of active material and the particles thereof whereby the particles of active material adjacent said conductive member are deformed thereagainst and the surface of said layer adjacent such conductive member is conformed to the adjacent surface of the latter, removing said pressure and securing said members together under a pressure less than the deformative pressure but sufficient to firmly maintain the active material in close surface contact with said conductive member, substantially as described.

19. The method of forming a battery pile which consists in assembling a series of flat conductive members, flat insulating members and layers of active material consisting of masses of solid particles, with the insulating members respectively disposed between adjacent conductive members and with the layers of active material respectively between the insulating members and the adjacent conductive members, then subjecting the assembly to a pressure sufficient to deform the layers of active material and the particles thereof whereby the particles of active material adjacent said conductive members are deformed thereagainst and the surfaces of said layers respectively adjacent such conductive members are conformed to the respective adjacent surfaces of the latter, removing the said pressure, and securing said members together under a pressure less than the deformative pressure but sufficient to firmly maintain the layers of active material respectively in close uninterrupted surface contact with said conductive members, substantially as described.

20. The method of making a battery pile which consists in forming a plurality of sections each comprising a plurality of alternately arranged superposed conductive and insulating members and layers of active material each comprising a mass of solid particles respectively disposed between the adjacent members, subjecting each of said sections to a high pressure sufficient permanently to deform the layers of active material thereof and the particles of such layers whereby the particles of active material adjacent said conductive members are deformed thereagainst and the surfaces of said layers adjacent such conductive sheets are respectively conformed to the adjacent surfaces of the latter, removing the pressure from said sections, then assembling said sections by superposing the same, subjecting the assembly to a pressure less than the deformative pressure, removing the pressure from the assembly and securing said sections together under a pressure less than the deformative pressure but sufficient to maintain the surfaces of all the layers of active material in close surface contact with the respective conductive members, substantially as described.

21. The method of making a battery pile which consists in forming a plurality of sections each comprising an insulating sheet coated with active material, subjecting said sections to a high pressure sufficient permanently to deform the layers of active material thereof, removing the pressure from said sections, then assembling said sections by superposing the same and conductive sheets with the latter respectively disposed between adjacent sections, subjecting the assembly to a pressure less than the deformative pressure, removing the pressure from the assembly and securing said sections and conductive sheets together under a pressure less than the deformative pressure but sufficient to maintain the layers of active material in close, uninterrupted surface contact with the respective adjacent conductive sheets, substantially as described.

22. A battery pile comprising a series of superposed thin conductive sheets separated by thin pieces of flexible insulating material, thin layers of active material respectively disposed between and in engagement with both surfaces of each of the sheets and the adjacent surfaces of the pieces of insulating material, and means for securing all of said elements together whereby the active material is maintained under pressure firmly in substantially uninterrupted surface contact with said sheets, substantially as described.

23. A battery pile comprising a series of superposed thin conductive sheets separated by thin pieces of paper, thin layers of active material respectively disposed between both surfaces of each of the sheets and the adjacent surfaces of the pieces of paper, and means for securing all of said elements together whereby the active material is maintained under pressure firmly in substantially uninterrupted surface contact with said sheets, substantially as described.

24. In a storage battery, a battery pile comprising a series of superposed thin conductive sheets separated by thin pieces of flexible insulating material, thin layers of active material respectively disposed between and in engagement with both surfaces of each of the sheets and the adjacent surfaces of the pieces of insulating material, and means for securing all of said elements together whereby the active material is maintained under pressure firmly in substantially uninterrupted surface contact with said sheets, and an alkaline electrolyte in which said pile is disposed, substantially as described.

25. A storage battery comprising a conductive sheet, a porous insulating member, active material between and in engagement with the sheet and insulating member, and means for securing and holding said sheet and member together whereby the active material is maintained under pressure firmly in substantially uninterrupted surface contact with said sheet, substantially as described.

26. A storage battery comprising a series of conducting sheets, flat, porous insulating members respectively disposed between the adjacent sheets, active material between and in engagement with the insulating members and the adjacent sheets, and means for holding said sheets and members together, whereby the active material is maintained under pressure firmly in substantially uninterrupted surface contact with the adjacent sheets, substantially as described.

27. In a storage battery, a conductive sheet, an insulating sheet and a layer of active material between said sheets forced together under an initial heavy pressure, and means for holding such sheets and layer together under a pressure less than the initial pressure but sufficient to maintain said layer of active material firmly in contact with said conductive sheet, substantially as described.

28. The method which consists in subjecting an assembly comprising superposed members and a layer of active material between each two adjacent members to an initial heavy pressure, and securing said members together under a pressure less than said initial pressure but sufficient to maintain each layer of active material firmly in contact with an adjacent member, substantially as described.

This specification signed this 14th day of June, 1920.

THOS. A. EDISON.